May 13, 1952 W. C. RYKERT 2,596,727

HIGH-FREQUENCY TUNING APPARATUS PARTICULARLY ADAPTED TO SEAMERS

Filed April 3, 1947 7 Sheets-Sheet 1

INVENTOR.
WILLARD C. RYKERT
BY
H. C. Diesered
ATTORNEY

May 13, 1952

W. C. RYKERT
HIGH-FREQUENCY TUNING APPARATUS
PARTICULARLY ADAPTED TO SEAMERS 2,596,727

Filed April 3, 1947

7 Sheets-Sheet 2

INVENTOR.
WILLARD C. RYKERT
BY
H. C. Diesend
ATTORNEY

May 13, 1952

W. C. RYKERT
HIGH-FREQUENCY TUNING APPARATUS
PARTICULARLY ADAPTED TO SEAMERS 2,596,727

Filed April 3, 1947

7 Sheets-Sheet 3

INVENTOR.
WILLARD C. RYKER
BY
H. C. Diesend
ATTORNEY

May 13, 1952 W. C. RYKERT 2,596,727
HIGH-FREQUENCY TUNING APPARATUS
PARTICULARLY ADAPTED TO SEAMERS
Filed April 3, 1947 7 Sheets-Sheet 4

INVENTOR.
WILLARD C. RYKERT
BY
H. C. Diemud
ATTORNEY

INVENTOR.
WILLARD C. RYKERT
BY
H. C. Dieserud
ATTORNEY

May 13, 1952 W. C. RYKERT 2,596,727

HIGH-FREQUENCY TUNING APPARATUS PARTICULARLY ADAPTED TO SEAMERS

Filed April 3, 1947 7 Sheets-Sheet 6

INVENTOR.
WILLARD C. RYKERT
BY
H. C. Dieserud
ATTORNEY

FIG. 16.
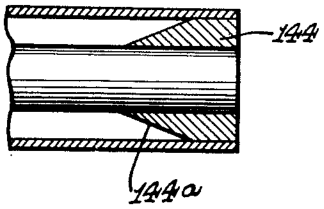
FIG. 17.
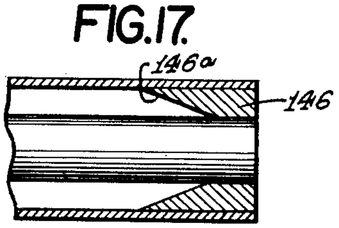
FIG. 18.
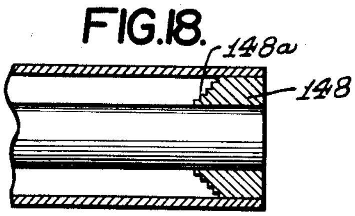
FIG. 19.
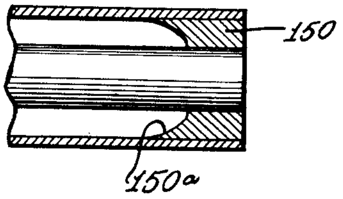
FIG. 20.
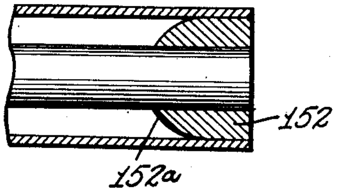
FIG. 21.
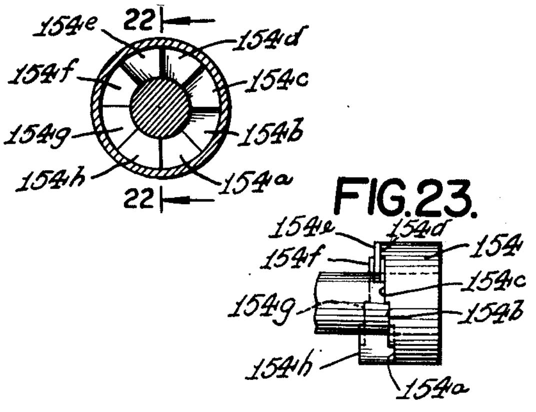
FIG. 21. FIG. 23.
FIG. 22.
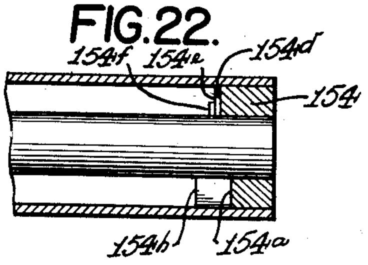
INVENTOR.
WILLARD C. RYKERT
BY
H. C. Diesend
ATTORNEY Patented May 13, 1952

2,596,727

UNITED STATES PATENT OFFICE 2,596,727

HIGH-FREQUENCY TUNING APPARATUS PARTICULARLY ADAPTED TO SEAMERS

Willard C. Rykert, Hinsdale, Ill., assignor to Union Special Machine Company, Chicago, Ill., a corporation of Illinois Application April 3, 1947, Serial No. 739,073

11 Claims. (Cl. 219—47)

This invention relates to apparatus for seaming or bonding together parts with the aid of a high-frequency electric field. More specifically, it relates to apparatus of this type for seaming sheets of dielectric material, such as plastic film, at least one of which becomes plastic and tacky when heated.

The present invention is especially applicable for forming a continuous seal between parts, and its advantages are particularly apparent in case there are variations in the thickness of the parts being sealed. In pending United States application Serial No. 662,422 filed April 16, 1946 by Robert A. Hayes and Willard C. Rykert, now Patent 2,522,823, difficulties were pointed out which previously existed in connection with electronic seaming operations involving variations in thickness of the work or variations in the number of plies being seamed. In that application mechanically movable tuning means were provided, adapted to be actuated by variations in the separation of the work-engaging electrodes as a result of variations in thickness of the work. One difficulty which arises in connection with such a structure is the possibility of backlash. Since small mechanical errors may produce large errors in the amount of power supplied to the work, backlash is especially undesirable.

An object of the present invention is to provide a tuning device which remains fixed, so far as mechanical movement is concerned, during the seaming operation, but which is capable of delivering power to the work in suitable amounts regardless of variations in the thickness of the work, within practical limits. In accomplishing this end, the tuning device is of special configuration, to be described at a later point. It may, in addition, include manually adjustable tuning means adapted to be initially adjusted by the operator to a position depending upon the nature and thickness of the work being seamed. One important feature of the present invention is that it eliminates the necessity for mechanically moving any tuning elements in response to the thickness of the work during the seaming operation.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Fig. 1 is a front view of the machine, partly in elevation and partly in section, with certain parts broken away for clarity of illustration.

Figs. 16–20 are longitudinal sectional views through portions of stubs representing various different embodiments of the present invention.

Fig. 21 is a cross-sectional view through a stub terminated by conducting material arranged in the shape of a circular staircase, winding around the inner conductor of the stub.

Fig. 22 is a longitudinal sectional view through the stub illustrated in Fig. 21, the section being taken in the plane 22—22, as indicated in Fig. 21.

Fig. 23 is a side elevational view of the embodiment illustrated in Figs. 21 and 22, with the outer conductor removed.

The illustrative apparatus is adapted to seam or bond together sheet-like material such as plastic film. At least one of the sheets should be of a material which becomes tacky when heated. There is provided in the machine to be described a pair of spaced roller electrodes adapted to engage the film and means for driving these rollers so as to advance the film between them. A source of high-frequency electrical power is connected through a "tuning stub" to the electrodes so as to establish between them a high-frequency electrostatic field. The plastic sheets, when subjected to the field, become heated in accordance with well-known principles. Since the sheets are in contact and somewhat under pressure from the roller electrodes, they become fused together in the region which passes between the rollers. As was pointed out in the aforementioned Patent 2,522,823, variations in the separation of the rollers resulting from the variations in the thickness of the work have a tendency to alter the tuning of the apparatus. One of the chief reasons for this effect is that when the electrodes are separated by a greater distance, the capacitance between them decreases, thereby changing the nature of the load. As a result, the power supplied to the work will vary with the thickness of the work in the absence of means for preventing this effect. If the apparatus should be initially tuned to deliver approximately maximum power to the work, then an increase in thickness of the work will decrease the power delivered to the work. When thicker regions or a greater number of plies of the film are between the electrodes, considerably more power is needed in order adequately to soften the film for bonding. In the present invention there is provided a novel type of tuning stub, having the advantage that power in suitable quantities is supplied to the electrodes for various thicknesses of the work.

As will be more fully described herein, in the present invention there is provided apparatus for bonding together dielectric parts, comprising at least two electrodes adapted for receiving said parts therebetween, a source of high frequency electrical energy, coupling means connecting said source to said electrodes, and a less-than-quarter-wavelength section of enclosed conductor having its first end connected to said coupling means and its other end short-circuited by a conducting surface of a special configuration. An important feature of the present invention is that certain portions of this conducting surface are positioned at a greater distance than others from said first end of said conductor. The invention may be described in more complete detail in connection with the attached drawings.

Figure 1:
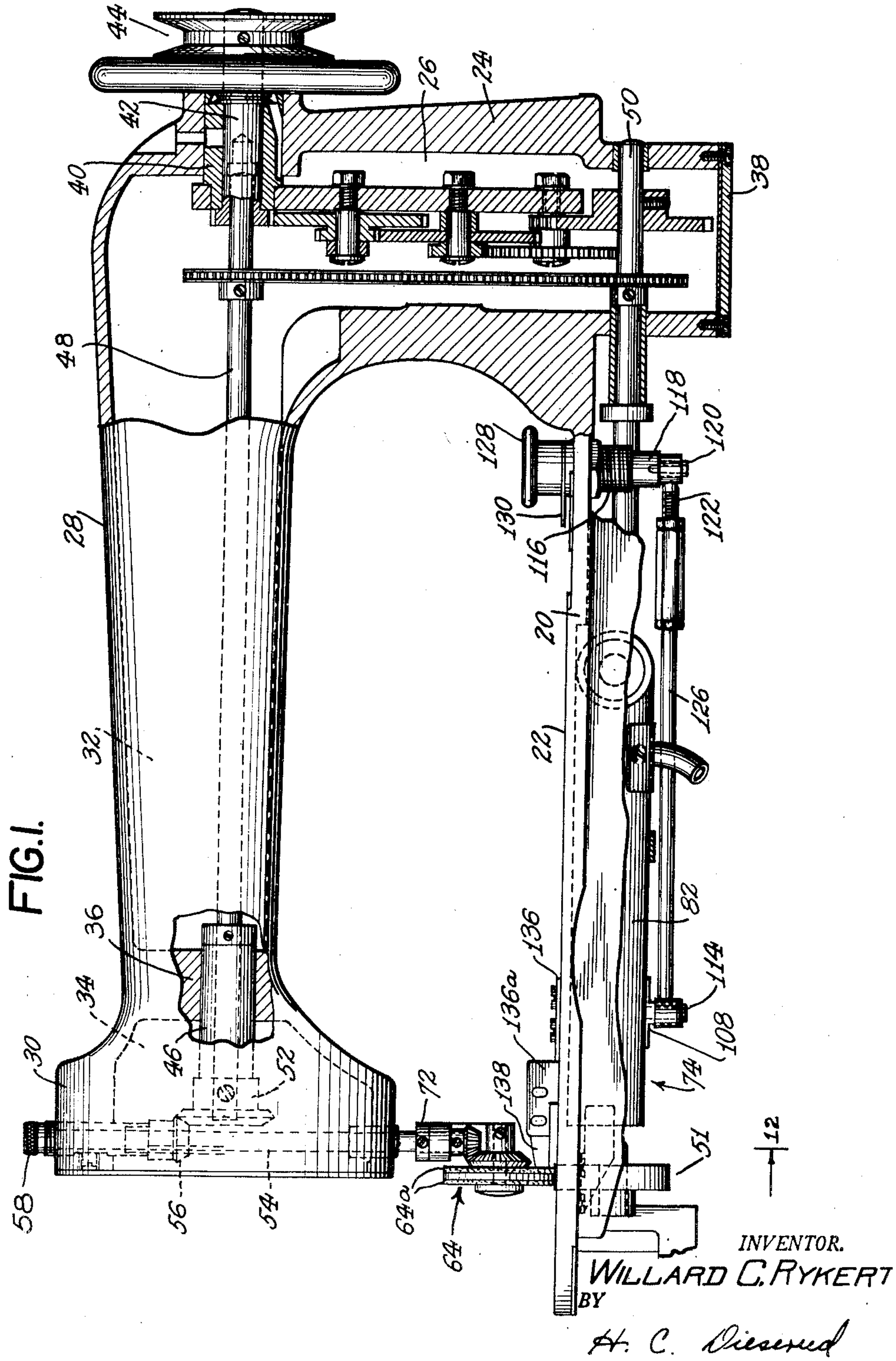
Figure 2:
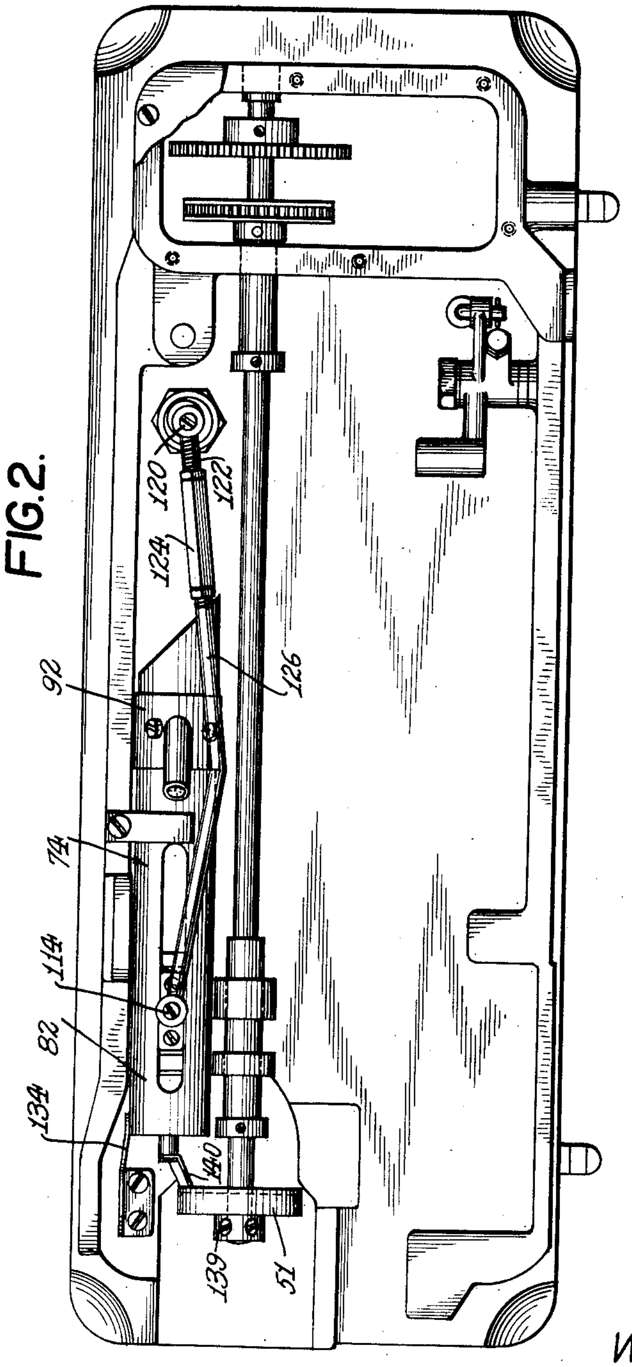
Fig. 2 is a view of the machine from underneath same.

Reference is made to Fig. 1. There is provided a metallic base 20 having a work surface 22. Rising from the right-hand side of the base, as shown, is a hollow vertical standard 24 having an interior cavity 26. Integrally formed with the standard 24 at its upper end is a hollow arm 28 which over-reaches the base 20 and terminates in a hollow head 30. The arm 28 and head 30 have interior cavities 32 and 34, respectively, isolated by a transverse partition or wall 36. The cavity 32 of the arm 28 communicates at its right-hand end directly with the cavity 26 of the vertical standard 24. The standard 24 is provided with a portion extending below the work surface 22, and this portion is closed at its lower end by a plate 38 screwed to the base and fitted with an appropriate gasket so as to form within the standard 24 a lubricant reservoir. Mounted in the standard 24 is a bushing 40, and journalled for rotation in this bushing is a stub shaft 42 extending outside the machine and carrying a combined hand wheel and belt pulley 44. Mounted in the wall 36 is a bushing 46. Journalled in the stub shaft 42 and in the bushing 46 is a rotary upper drive shaft 48. As shown in Figs. 1 and 2, journalled for rotation in suitable bushings carried by various portions of the base is a generally horizontal lower drive shaft 50. Mounted on the left-hand end of this shaft is a lower roller electrode 51, adapted to cooperate with an upper roller electrode, to be described. This drive shaft may conveniently be of integral construction, since in the present embodiment it is contemplated that the lower electrode will not yield vertically in response to variations in the thickness of the work. Instead, the upper electrode will yield, as will be described. There is provided a system of gears not described herein in detail for transmitting power from the stub shaft 40 to the shaft 50, and a chain drive for transmitting power from the shaft 50 to the shaft 48. Reference may be made to the aforementioned Patent 2,522,823 for an explanation of details of this gear system and chain drive.

Figure 3:
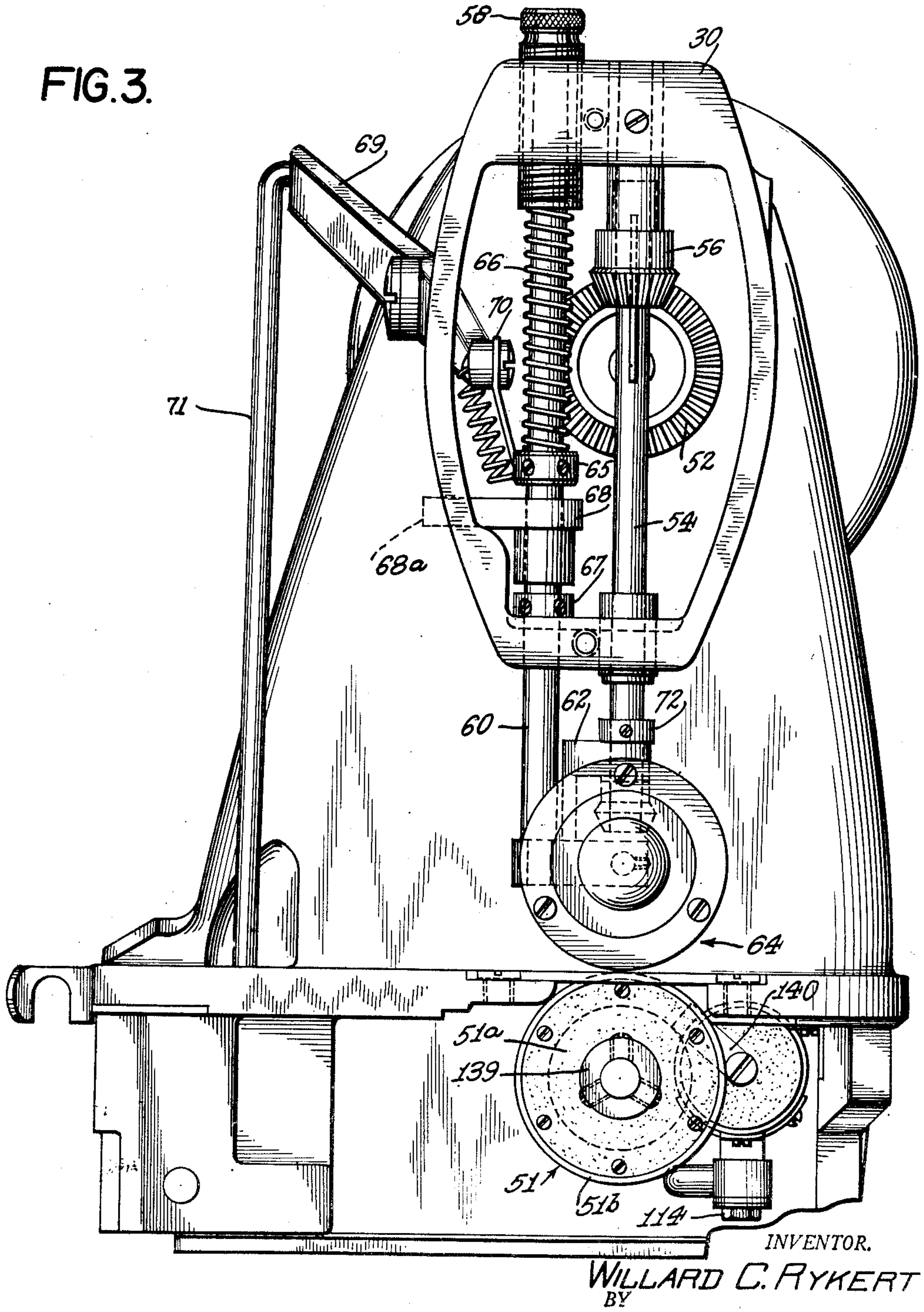
Fig. 3 is an elevational view of the machine as seen from the left of Fig. 1.

As shown in Figs. 1 and 3, the shaft 48 projects into the head 34 and carries at its left-hand end a gear 52. There is provided within the head a generally vertical rotary shaft 54, journalled in suitable bushings, and carrying a gear 56. The machine is arranged as described in the aforementioned Patent 2,522,823 so that the gears 52 and 56 cooperate and serve to drive the shaft 54, but so that the shaft 54 may be shifted somewhat vertically in connection with variations in the thickness of the material being seamed without interrupting this driving action. Threaded into the head 30 is a knurled headed bushing 58. There is provided a presser bar 60, mounted for vertical reciprocation in the bushing 58 and in the lower wall of the head 30. The presser bar 60 carries at its lower end a bracket 62. A lower portion of the bracket 62 carries a pin on which there is mounted an upper roller electrode 64, suitably driven by the shaft 54.

Mounted on the presser bar 60 is a collar 65, and there is provided a spring 66 coiled around the presser bar 60 engaging at its upper end the bushing 58 and at its lower end the collar 65. This spring tends to press the presser bar downwardly and hence to cause the upper electrode to engage the work in cooperation with the lower electrode. There is provided a collar 67 mounted on the bar 60 adapted to limit the downward motion of the presser bar 60 so that the upper roller electrode cannot contact the lower roller electrode when there is no work in the machine. The tension in the spring 66 is suitably chosen so that this spring yields when thicker portions of the work, such as cross seams, pass between the roller electrodes, thus allowing the upper electrode to be raised by the work.

Means are provided for lifting the presser bar 60. Carried by this bar between the collars 65 and 67 is a collar 68 having a portion 68a projecting through a guide slot in the rear wall of the head 30. Pivotally mounted on the rear wall of the arm 28 is a rocker arm 69. There is provided a link 70 pivotally connected to one end of the arm 69 and to a portion of the collar 68. A rod 71 is pivotally connected to the other end of the arm 69 and extends downwardly therefrom to a foot treadle or knee press, not shown. When the rod 71 is moved downwardly, the arm 69 is caused to rock on its pivot, thereby lifting the presser bar against the action of the spring 66. A portion of the bracket 62 encircles the shaft 54 and engages a collar 72 thereon so that when the presser bar is lifted by the operator or by thicker material passing through the electrodes, the shaft 54 is likewise moved upwardly.

Figure 7:
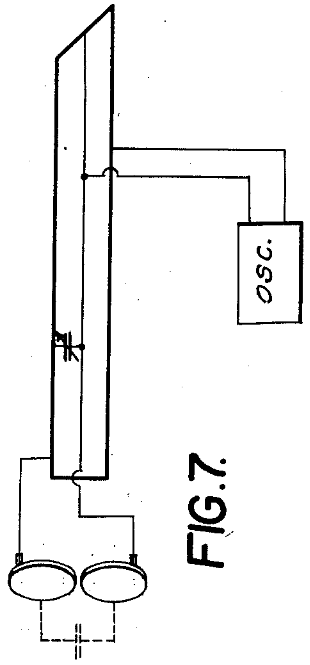
Fig. 7 is a semi-schematic diagram illustrating very roughly the circuit of an embodiment of the invention.
Figure 8:
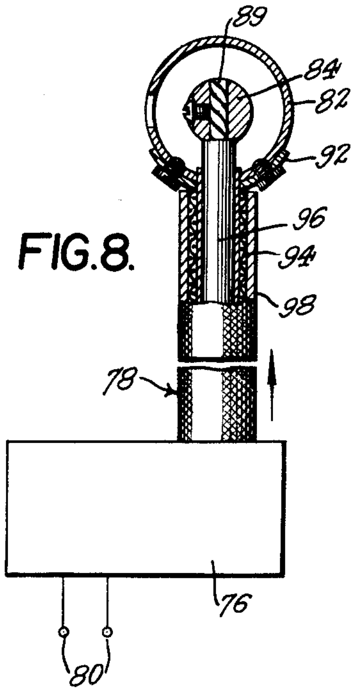
Fig. 8 is a cross-sectional view of the tuning stub at the plane 8—8 as shown in Fig. 5, including the cable, partly in longitudinal section, and a schematic representation of a source of high frequency electrical energy.
Figure 9:
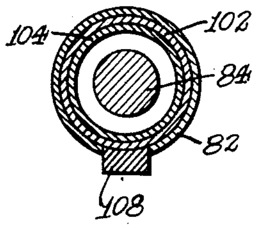
Fig. 9 is a cross-sectional view of the tuning stub the section being taken in the plane 9—9 as shown in Fig. 4.

Mounted beneath the base is a tuning stub generally indicated by the numeral 74 in Fig. 1, and shown in detail in one embodiment in Figs. 4, 5, 6, 8 and 9, and shown semi-schematically, connected with other portions of the circuit, in Fig. 7. The apparatus is provided with a source 76 of high frequency electrical energy, connected to the tuning stub as indicated in Fig. 8 through a cable 78. The source 76 may be energized from a D.-C. or A.-C. source of potential, indicated at the terminals 80.

Figure 4:
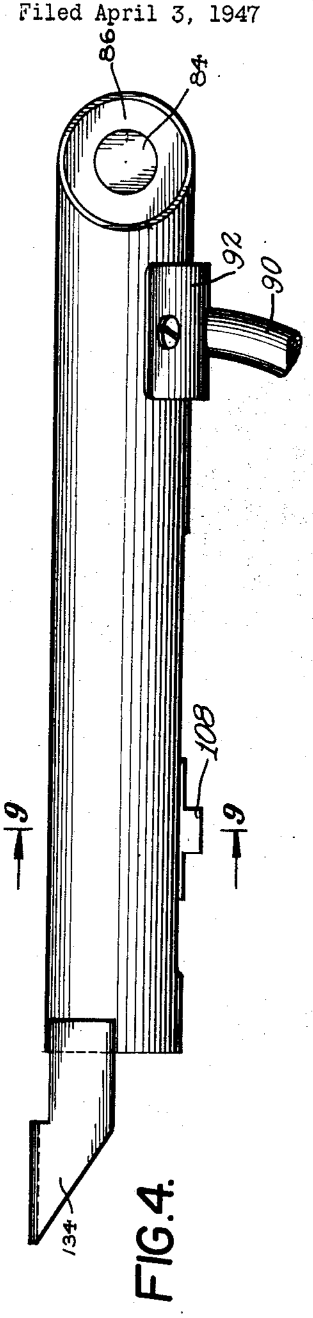
Fig. 4 is a view of a tuning stub, in elevation.
Figure 5:
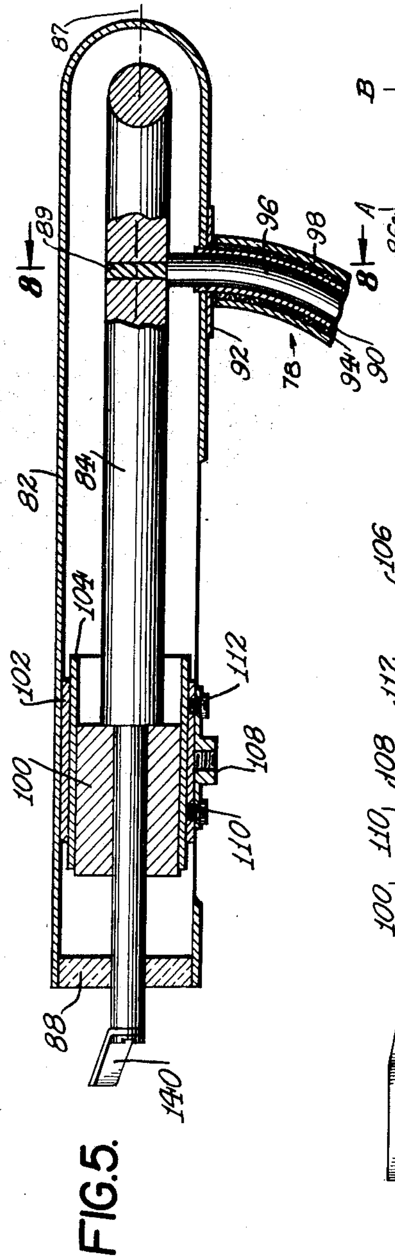
Fig. 5 is a longitudinal section through the tuning stub shown in Fig. 4, in a vertical plane.
Figure 6:
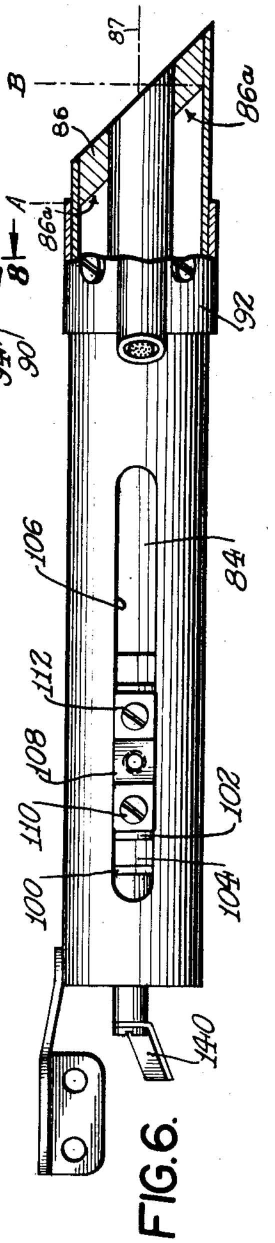
Fig. 6 is a view of this tuning stub as same would be seen from beneath the machine, a portion thereof being shown in longitudinal section, illustrating the oblique arrangement of the short-circuiting member.

The stub comprises an outer metallic cylinder or conductor 82 and an inner coaxial rod or conductor 84. As an important feature of the present invention there is provided at the right-hand end of the stub, short-circuiting means 86 having a special configuration. As illustrated in Figs. 4–6, the short-circulating means may be of metal or other conducting material welded or otherwise affixed to the inner and outer conductors and extending between same, and having an inner face 86*a* obliquely oriented with respect to the longitudinal axis 87 of the stub. In Figs. 4–6 this inner face 86*a* is planular and the angle between the axis of the stub and its projection in the plane of the face 86*a* is substantially 45°. Such an angle and such a configuration have been found quite satisfactory. In any event, this angle should be more than 30° and less than 60°. Short-circuiting means having inner faces other than planular will be described at a later point.

The shape and orientation of the outer face of the short-circuiting means 86 is not particularly important. Thus this outer face may have an oblique orientation as shown in Fig. 6, or might be perpendicular to the axis of the stub. On the other hand, the shape and orientation of the inner face of the short-circuiting means is highly important. The structure described in the present invention is to be distinguished from structures having planular inner faces perpendicular to the axis of the conductor.

The member 86, in addition to electrically connecting the inner conductor to the outer conductor, serves as a mechanical support for the inner conductor. The inner conductor 84 has a portion of reduced diameter toward its left-hand end and is supported at this end by a dielectric ring 88, the conductor extending through this ring and out of the stub. Means are provided for connecting the cable to the stub at a point 89 near the member 86. The distance from the point 89 to the inner face 86*a* of the member 86 should be less than one-quarter wavelength, or the equivalent thereof. As will be discussed at a later point, it may be seen that this distance is different when measured to various points of the obliquely oriented face 86*a*. In the present embodiment this distance is considerably less than one-quarter wavelength such as for example one-sixtieth wavelength. For the purpose of securing the cable to the stub there may be provided a brass tube 90 welded or otherwise secured to a curved plate 92, which in turn is screwed to the cylinder 82. The cable 78 may have an outer conductor which may comprise a copper mesh 94 separated from the inner conductor by insulating material 96 and having an outer sheath or covering of insulating material 98.

Mounted on the reduced portion of the inner conductor is a solid metallic cylinder 100, as by being soldered or welded thereon. This cylinder, as well as the inner and outer conductors of the tuning stub and the member 86, may satisfactorily be of brass.

There is provided within the tuning stub a slidable brass or other metallic sleeve 102 dimensioned to have a sliding fit with the inside wall of the conductor 82. The sleeve 102 is pressed onto a dielectric insulator sleeve 104, dimensioned to have a sliding fit over the cylinder 100. The sleeve 102, together with its dielectric sleeve 104 and the cylindrical member 100 comprises a variable capacitor adapted for varying the capacitance between the inner conductor 84 and the outer conductor 82 of the tuning stub. The outer conductor is provided with a lengthwise slot 106, and mounted in this slot is a runner 108, fastened to the sleeve 102 by a pair of screws 110 and 112.

Figure 11:
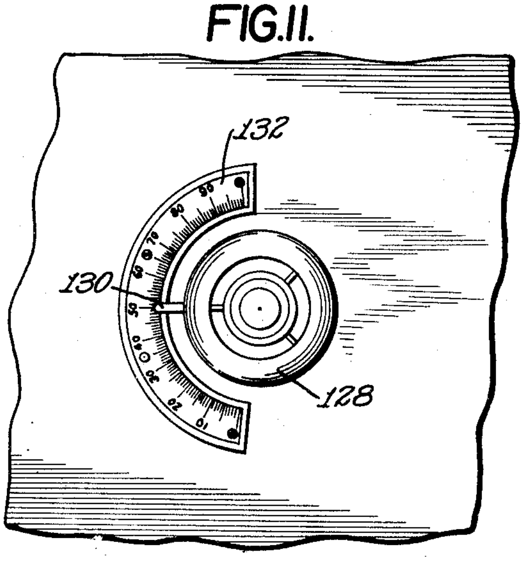
Fig. 11 is a plan view of a control knob and scale which the operator may use for manually adjusting the tuning of the apparatus before commencing the seaming operations.
Figure 12:
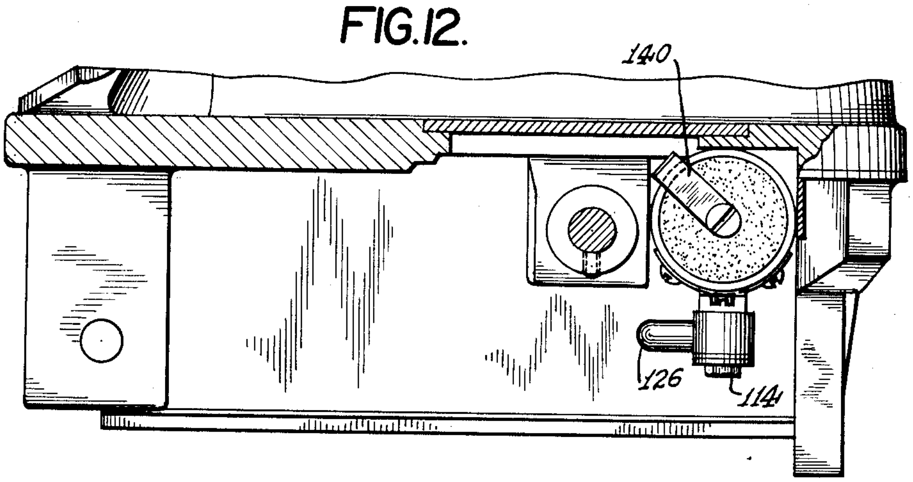
Fig. 12 is a view partly in elevation and partly in section, showing the output connection from the inner conductor of the tuning stub. the position of the section being shown in Fig. 1 at 12.

Threaded into the runner 108 is a shoulder screw 114, as shown in Figs. 1–3. Mounted in the base is a bushing 116, and journalled in this bushing is a shaft 118. Threaded into the lower end of this shaft in a position eccentric with respect to the axis of this shaft is a shoulder screw 120. Pivotally mounted on the shoulder screw 120 is a rod 122, threaded at its left-hand end as shown in Fig. 2 to receive a turnbuckle 124. Pivotally mounted on the shoulder screw 114 is a rod 126, also threaded to engage the turnbuckle 124. The rod 126 may conveniently be bent as shown in Fig. 2 to circumvent the cable. Mounted on the upper end of the shaft 118 is a control knob 128, carrying a pointer 130, as shown in Figs. 1 and 11. Mounted on the base as by screws is a scale 132, marked suitably to indicate the position of the pointer 130. When the control knob 128 is rotatably positioned by the operator, the eccentric motion of the shoulder screw 120, together with the action of the means linking this screw with the slidable sleeve 102, causes this sleeve to be displaced axially along the tuning stub. The operator can initially adjust the setting of this sleeve to a desired tuning position depending upon the nature and type of material being seamed, as will be described below.

Figure 10:
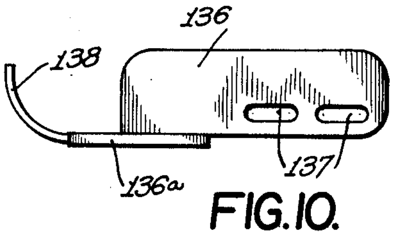
Fig. 10 is a view of one form of electrical connection to the upper roller electrode as seen from above.

The upper roller electrode 64 may be chiefly of metal construction, but may have dielectric ring-like inserts on its edges, to prevent the work being softened underneath these edges, so that the material engaged by the upper electrode is firm and hence capable of being advanced satisfactorily. The outer conductor of the tuning stub is electrically connected to the base of the machine by an element 134, screwed to the base and soldered to the outer conductor. The base of the machine may for convenience be maintained at ground potential by means not shown. There is provided means for electrically connecting the upper roller electrode to the base of the machine. Such means, as shown in Figs. 1 and 10, may comprise a bracket 136 screwed to the base through slots 137, and having an upstanding portion 136*a*. Secured to the portion 136*a* is a spring-like contact member 138, adapted to engage a metallic portion of the upper roller electrode.

The lower roller electrode 51 as shown in Fig. 3 may comprise an inner dielectric portion 51*a* and an outer metallic conducting rim 51*b* carried thereby. The portion 51*a* may be mounted on the shaft 50 by means of a sleeve or hub 139. The outer rim 51*b* is thus electrically insulated from the shaft 50. Means are provided for electrically connecting the inner conductor of the tuning stub to the rim 51*b* of the lower roller electrode. For this purpose there is provided a contact member 140 screwed to the inner conductor and slidably engaging at its free end the rim 51*b*.

At the point 89 where the cable is connected to the tuning stub, there is presented, looking into the stub from the cable, a parallel circuit comprising: a capacitive impedance between the electrodes determined by the thickness and nature of the work; a capacitive impedance between the inner and outer conductors of the stub determined largely by the setting of the slidable sleeve 102; and an inductive impedance corresponding to the section of the stub extending toward the right of the point 89, this section being short-circuited in the novel manner herein described. It may be assumed that the impedance looking toward the source 76 from the tuning stub at the point 89 is such that as the aforementioned parallel circuit approaches a condition of resonance, the power delivered to the work approaches a maximum, because of better impedance matching.

Let it be supposed that the operator initially sets the slidable sleeve 102 by means of the control knob 128 to such a position that the parallel circuit represented by the two capacitive impedances and the inductive impedance mentioned above is almost but not quite in resonance, there being slightly too much capacitance for resonance. If the electrodes are now separated by a greater distance as a result of a greater number of plies or a thicker portion of work passing between them, the capacitance between the electrodes will, as a consequence, be decreased. This will have the effect of bringing the parallel circuit more nearly into resonance, which effect will have some tendency to increase the power supplied to the work. As a result, the seaming device with the novel stub described herein will, for a considerable range of thickness of material, deliver suitable power to the work. There are other effects which are interrelated and rather complex. For example, changes in temperature of the thermoplastic sheeting being bonded tend to change its dielectric constant and hence the impedance between the roller electrodes. Also, as more power is delivered to the load, the frequency of the source oscillator may tend to drop slightly, thus altering the tuning of the circuit, with a consequent variation in the power delivered to the work.

In the aforesaid patent application Serial No. 662,422 of Hayes and Rykert, there was described means adapted to vary the position of the slidable sleeve in response to variations in the thickness of the work, for the purpose of controlling the tuning of the circuit so as to deliver a suitable amount of power to the work. The stub described in that application was short-circuited with a 90° termination.

Since systems involving motion of the slidable sleeve during the seaming operation are subject to backlash, it is desirable to eliminate the necessity for continuously controlling this sleeve. In the present invention, the sleeve normally remains fixed in position during seaming operations. It is moved by the operator only when a different type of work is to be bonded. Also, as an important feature in the present invention, instead of using a 90° short-circuiting termination for the stub, the inner and outer conductors are short-circuited by a conducting surface certain portions of which lie farther from the point where the cable enters the stub than do others. Thus the short-circuiting termination may have the form of the element 86, having an inner face 86*a* lying in a plane at an oblique angle to the axis of the stub.

The short-circuiting element 86 may be assumed to be permanently fixed in position. In any event, it is contemplated that the element 86 will remain fixed in position during any seaming operation. It is to be noted that in the present invention one of the novel features of the tuner for regulating the power delivered through the electrodes to the dielectric sheets of varying aggregate thickness is the fact that the tuner is adapted to remain fixed in position during any seaming operation, irrespective of relative movement between the electrodes. The tuner of the present invention is therefore to be distinguished from tuners which depend upon mechanical linkages actuated by variations in the separation of the electrodes adapted to vary the position of a movable element of the tuner in order to control the power output of the device.

The impedance characteristics of the stub of the present invention are different from those of one which is short-circuited by a perpendicular conducting surface. It is believed that one difference is that a length of enclosed conductor of, say, considerably less than one-quarter wavelength, terminated as described in the present invention, has a steeper impedance versus frequency curve than does a perpendicularly short-circuited enclosed conductor of approximately equal impedance, for the same range of frequency. This characteristic would be significant if there are slight variations in the frequency of the source oscillator as various thicknesses of material pass between the electrodes. Thus when thicker portions of material pass between the electrodes, if the increased load causes the frequency of the source to drop slightly, the electrical length of the inductive end of the stub is decreased. For a perpendicularly short-circuited conductor there would as a result be a certain decrease in the inductive impedance. If the impedance versus frequency curve of the conductor terminated as herein described is steeper, however, than that of the perpendicularly short-circuited conductor, there would be a greater drop in the inductive impedance presented by the conductor. Assuming, as before, that the device has initially been adjusted so that a decrease in capacitance will increase the power by bringing the circuit more nearly into resonance, then it follows that the stub terminated as herein described will as a result of any drop in the frequency of the source, produce a greater increment of power delivered to the load than would a perpendicularly short-circuited conductor.

It is to be understood that the present invention is not to be limited by any theoretical explanations contained herein.

Recalling that the impedance presented by a segment of short-circuited enclosed conductor is a function of the length of the segment, one may conceive of a system employing a perpendicular short-circuiting element adjustable longitudinally along the stub for tuning same. For a given variation in thickness of the material, adjustment between positions such as A and B shown in Fig. 6 might be necessary in order that a proper amount of power might be delivered to the load. In the present invention, as indicated, it has been found that excellent results may be obtained by employing an inclined or oblique short-circuiting element, such as 86, fixed in place. As illustrated in Fig. 6, the angle of inclination should preferably be such that the positions of the extremities of the inner face 86*a* at their points of greatest separation one from the other correspond approximately to the positions A and B, mentioned above. That is, the positions of the extremities of the inner face should preferably correspond to the respective positions where a perpendicular short-circuiting element would be positioned for proper tuning in connection with a given variation in thickness of the work. It has been found that quite satisfactory operation may be usually obtained with the inner face of the short-circuiting element at an angle of substantially 45° to the axis of the stub. In any event, the angle between the axis of the stub and its projection on the inner surface of the short-circuiting element should be more than 30° and less than 60°.

Figures 13, 14:
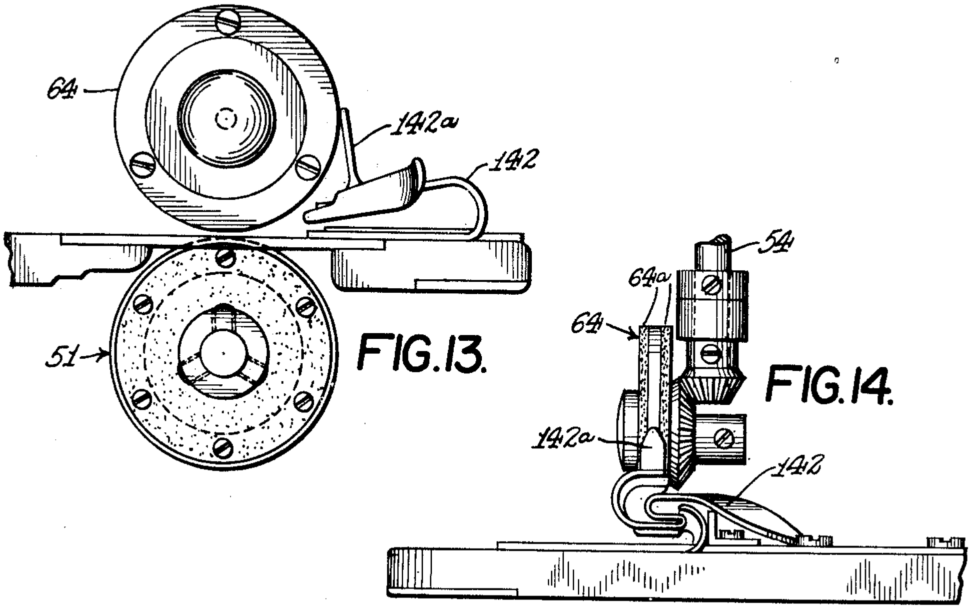
Fig. 13 is an elevational view showing the roller electrodes, as seen from the left end of the machine, together with a special double-lap seam feller folder, adapted to provide an electrical connection to the upper roller.
Fig. 14 is a front elevational view of a folder of the type shown in Fig. 13 cooperating with an upper roller electrode.
Figure 15:
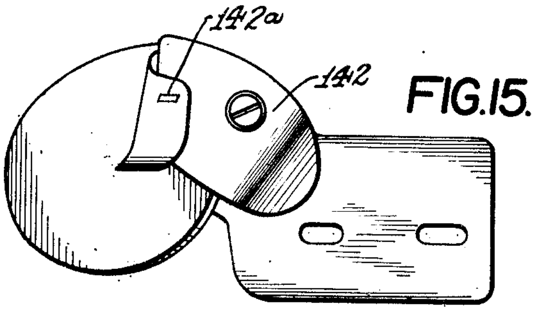
Fig. 15 is a plan view of the folder shown in Figs. 13 and 14, as seen from above.

Figs. 13–15 show a modified embodiment illustrating a special means of energizing the upper roller electrode, in connection with a double-lap seam feller folder 142 having a portion 142*a* adapted to engage the periphery of the metallic portion of the upper roller electrode 64. The folder 142 is mechanically and electrically connected to the base, and it, together with the portion 142*a*, provides an electrical connection from the base to the upper roller electrode. With such a modification, it is possible to form a double-lap seam in the material being bonded. One sheet of the material will extend to the right of the folder, and one portion to the left thereof.

Figs. 16–23 represent various different embodiments of the short-circuiting means at the right-hand or inductive end of the stub.

In Fig. 16 there is provided short-circuiting means 144 having an inner face or conducting surface 144*a* which is generally conical in shape. Otherwise described, this inner surface is in the shape of a surface of revolution generated by revolving about the longitudinal axis of the stub a straight line oriented so that if extended it would intersect the axis and form an obtuse angle with the portion of the axis extending toward the interior of the stub, that is, toward the rollers.

Fig. 17 may be considered the counterpart of Fig. 16, in that there is provided a short-circuiting element 146 having a surface 146*a*, in the shape of a surface of revolution which would be generated by revolving about the longitudinal axis of the stub a straight line lying at an acute angle to said axis. In Fig. 17 it may be said that there is provided a conducting surface tapering between the outer and inner conductors of the transmission line.

In Fig. 18 there is provided a short-circuiting element 148 having an inner conducting surface 148*a* in the shape of a series of steps. This surface may also be a surface of revolution. In other embodiments, however, step-like terminations may be employed which are not surfaces of revolution, that is, which are dissimilar in their various longitudinal sections.

In Fig. 19 there is provided a short-circuiting element 150 having a concave inner conducting surface 150*a*.

In Fig. 20 there is illustrated a short-circuiting element 152 having a convex inner conducting surface 152*a*.

The embodiments shown in Figs. 19 and 20 may be described as being terminated by a conducting surface the shape of at least a portion of which is defined by a surface of revolution generated by revolving about the axis of a transmission line a smooth curve of varying slope with respect to the axis of the transmission line.

In Figs. 21, 22 and 23 there is illustrated a short-circuiting element 154 having an inner conducting surface in the shape of a circular staircase winding around the inner conductor. Thus there may be provided a series of steps, 154*a*, *b*, *c*, *d*, *e*, *f*, *g*, and *h*. As shown in Fig. 21, 154*a* is the lowest step, and the steps increase in height successively to 154*h*, which is the highest step.

In various embodiments of the present invention there is provided a source of high frequency electrical energy, at least two electrodes for receiving the thermoplastic sheets therebetween, coupling means, such as the cable 78 and the left-hand portion of the tuning stub connecting said source to said electrodes, and a less-than-quarter wavelength section of enclosed conductor having its one end connected to said coupling means and its other end terminated by a conducting surface. It will be noted that this conducting surface, as illustrated in the embodiment of Fig. 6, or in any of the embodiments of Figs. 16–23, is characterized by the fact that certain portions thereof lie a greater distance from the first-mentioned end of said enclosed conductor than do other portions.

One advantageous feature of the present device is that the rollers engage the work continuously and advance it continuously during the seaming operation, despite variations in its thickness. This is made possible by the cooperation of the automatic tuning means herein described.

While an illustrative form of the invention has been disclosed in considerable detail, it will be understood that various changes may be made in the construction and arrangement of the several parts without departing from the general principles and scope of the invention as defined by the appended claims.

I claim:

1. Apparatus for bonding together dielectric parts of varying aggregate thickness, comprising a plurality of separable electrodes adapted for receiving said parts therebetween, said electrodes having variable capacitance therebetween depending upon their separation, a source of high frequency electrical power, coupling means connecting said source to said electrodes, an enclosed conductor, less than a quarter wavelength in length having its first end connected to said coupling means, a terminating member at the other end of said conductor having a flat inner, conducting surface short-circuiting said conductor and extending obliquely across same, and means normally tuning said enclosed conductor and said electrodes to a near-resonant condition in which there is slightly too much capacitance for resonance, whereby said electrodes, when separated by a greater distance, deliver more power to said parts.

2. A tuning stub for use in apparatus for bonding together dielectric parts of varying aggregate thickness including a source of high-frequency power and a parallel circuit coupled to said source including separable electrodes having capacitance therebetween and reactance means, said stub comprising a less-than-quarter-wavelength, enclosed conductor connected in parallel with said electrodes, a flat, inner, conducting surface short-circuiting the free end of said enclosed conductor and extending obliquely across same, and means normally tuning said enclosed conductor to have slightly too much capacitance for resonance of said parallel circuit at the frequency of said source.

3. Apparatus for bonding together dielectric parts of varying aggregate thickness, comprising a plurality of separable electrodes adapted for receiving said parts therebetween, a source of high frequency electrical power, coupling means connecting said source to said electrodes, a section of enclosed conductor effectively less than a quarter wavelength having one end connected to said coupling means, and a terminating member at the other end of said conductor having a flat, inner, conducting surface short-circuiting said conductor and extending obliquely across same, the angle between the axis of said conductor and the projection of said axis on said surface being greater than 30° and less than 60°.

4. A tuning stub in apparatus for bonding together thermoplastic sheets of varying aggregate thickness of the type including a source of high frequency electrical power, a plurality of roller electrodes adapted to engage and advance said sheets, and means, including a coaxial transmission line, coupling said source to said electrodes, said tuning stub comprising a section of coaxial conductor having its first end coupled to said electrodes and its second end terminated in a flat conducting surface at an oblique angle to the axis of said conductor, said stub being provided on its interior with a manually variable capacitor between its inner and outer conductors, said transmission line being connected to said stub at a point displaced from said second end by such a distance that a condition differing but slightly from resonance is produced, said distance being less than a quarter wavelength whereby slight increases in thickness of sheets between said electrodes produce, as a result of said termination, corresponding increases of power supplied to said sheets.

5. A tuning stub for use in high-frequency electrical apparatus for bonding together dielectric parts of varying aggregate thickness, comprising a section of coaxial transmission line having an inner conductor and an outer conductor, effectively less than a quarter wavelength, a flat, oblique conducting wall short-circuiting one end of said transmission line, a solid conducting cylinder mounted longitudinally on said inner conductor, and a slidable conducting sleeve engaging the interior of said outer conductor, adapted to cooperate with said solid cylinder to vary the capacitance between said conductors.

6. Apparatus for bonding together thermoplastic dielectric parts of varying aggregate thickness, comprising, in combination, a source of high frequency electrical power, a first electrode, a second electrode yieldably separable therefrom, coupling means connecting said electrodes to said source, a coaxial transmission line stub connected to said coupling means in parallel with said electrodes, a planular conducting surface lying at an oblique angle to the axis of said stub, extending across same, and short-circuiting same at a point effectively less than a quarter wavelength from said coupling means, and a variable capacitor within said stub, normally adjusted to provide slightly too much capacitance for resonance, whereby said off-resonant-tuned capacitor, said oblique conducting surface, and said separable electrodes cooperate to deliver more power to aggregately thick portions of said dielectric parts than to thin portions of same.

rciorlinee

7. In a seamer for bonding together plies of thermoplastic material, comprising a pair of opposed roller electrodes adapted to engage the work, a source of high frequency electrical power, driving means adapted to rotate at least one of said roller electrodes continuously during the seaming operation, and coupling means connecting said source to said electrodes, a less-than-quarter-wavelength section of coaxial transmission line having its one end connected to said coupling means and closed at its other end by a planular conducting surface, the angle between the axis of said transmission line and its projection on said surface being greater than 30° and less than 60°.

8. In a seamer for bonding together plies of plastic material, comprising a pair of opposed roller-electrodes, a source of high frequency electrical power, means for driving said roller-electrodes for advancing the work therebetween, and an enclosed conductor connected to said source, a tuned stub connected between its ends to said conductor and connected to said electrode comprising a section of coaxial conductor short-circuited near one end by a conducting member having an inner planular surface lying in a plane intersecting the axis of said coaxial conductor at an angle of substantially 45°, the distance from said planular surface to the point of connection of said stub and conductor being effectively less than a quarter wavelength.

9. A tuner for a dielectric seamer of work of varying thickness of the type including a plurality of output electrodes adapted to receive the work therebetween, and a source of high-frequency electrical power, said tuner being connected to said source and to said electrodes and comprising a coaxial conductor effectively less-than-quarter-wavelength having one end short-circuited by a fixed conducting member having a flat face within said conductor lying generally in a plane intersecting said conductor at an oblique angle, and a manually adjustable reactance element connected to said coaxial conductor, said tuner being adapted to regulate accurately and automatically the power supplied to said work for varying thicknesses thereof between said electrodes.

10. A tuning stub in apparatus for bonding together dielectric sheets of the type including at least two roller electrodes adapted to engage and advance said sheets, a source of electrical power, and a transmission line connected to said source, said tuning stub being connected to said transmission line and to said electrodes and comprising a short-circuited section of transmission line connected in parallel with said electrodes, the length of said section being effectively less than a quarter wavelength, said section being short-circuited by a conducting surface extending obliquely across same at such an angle that the extremities of such surface are displaced with respect to each other longitudinally along said section by a distance equivalent to the distance through which a perpendicular short-circuiting surface would need to be moved for tuning said apparatus in connection with the variation in thickness of the work.

11. A tuning stub in apparatus for bonding together dielectric sheets comprising at least two roller electrodes adapted to engage and advance said sheets, a source of electrical power, and a transmission line connected to said source, said tuning stub being connected to said transmission line and to said electrodes and having a short-circuited section thereof connected in parallel with said electrodes, the length of said section being effectively less than a quarter wavelength, said section being short-circuited by a conducting surface extending obliquely across same, the extremities of said surface being located approximately at positions corresponding to those at which a perpendicular short-circuiting surface would be placed for properly tuning said apparatus in connection with the range of thickness of the work.

WILLARD C. RYKERT.

REFERENCES CITED

The following references are of record in the file of this patent:

UNITED STATES PATENTS

| Number | Name | Date |
|---|---|---|
| 2,150,246 | Roberts | Mar. 14, 1939 |
| 2,308,043 | Bierwirth | Jan. 12, 1943 |
| 2,331,193 | Hutcheson | Oct. 5, 1943 |
| 2,410,838 | Ring | Nov. 12, 1946 |
| 2,421,784 | Haeseler et al. | June 10, 1947 |
| 2,427,100 | Kihn | Sept. 9, 1947 |
| 2,427,693 | Ryder | Sept. 23, 1947 |
| 2,428,622 | Gurewitsch | Oct. 7, 1947 |
| 2,432,412 | Hacklander | Dec. 9, 1947 |
| 2,462,639 | Hubbard | Feb. 22, 1949 |
| 2,468,263 | Joy | Apr. 26, 1949 |
| 2,504,754 | Sweeny | Apr. 18, 1950 |

OTHER REFERENCES

Hoyler: An Electronic Sewing Machine, Electronics, August 1943, pages 90–93, 160, 162, 164, 166, 168; particularly pages 90–92.